(12) United States Patent
Roberts

(10) Patent No.: US 12,276,074 B2
(45) Date of Patent: Apr. 15, 2025

(54) TIDAL BARRAGE

(71) Applicant: VERDERG LIMITED, Woking Surry (GB)

(72) Inventor: Peter Roberts, Woking (GB)

(73) Assignee: Verderg Limited, Woking (GB)

( * ) Notice: Subject to any disclaimer, the term of this patent is extended or adjusted under 35 U.S.C. 154(b) by 0 days.

(21) Appl. No.: 18/283,273

(22) PCT Filed: Mar. 23, 2022

(86) PCT No.: PCT/GB2022/050730
§ 371 (c)(1),
(2) Date: Sep. 21, 2023

(87) PCT Pub. No.: WO2022/200789
PCT Pub. Date: Sep. 29, 2022

(65) Prior Publication Data
US 2024/0093451 A1  Mar. 21, 2024

(30) Foreign Application Priority Data
Mar. 25, 2021 (GB) ...................................... 2104198

(51) Int. Cl.
*E02B 9/08* (2006.01)
*E02B 7/20* (2006.01)
(Continued)

(52) U.S. Cl.
CPC ................ *E02B 9/08* (2013.01); *E02B 7/205* (2013.01); *E02B 7/50* (2013.01); *F03B 13/264* (2013.01); *F05B 2220/706* (2013.01)

(58) Field of Classification Search
CPC ........................................................ E02B 9/08
See application file for complete search history.

(56) References Cited

U.S. PATENT DOCUMENTS 3,974,655 A * 8/1976 Halpern .................. E02B 7/005
  405/115
4,252,461 A * 2/1981 Colamussi .............. E02B 7/005
  405/91
(Continued)

FOREIGN PATENT DOCUMENTS

AT       000503656     12/2007
CA       1204946       5/1986
(Continued)

OTHER PUBLICATIONS

Translation of KR 20120054227 A (Year: 2010).*
(Continued)

*Primary Examiner* — Sean Gugger
(74) *Attorney, Agent, or Firm* — Woods Rogers PLC; Timothy Bechen; Nathan Evans

(57) ABSTRACT

A tidal barrage comprising: a plurality of spaced towers, a plurality of barriers for controlling water flow through the barrage between the towers, and one or more turbine devices, wherein the towers comprise at least first, second and third towers, wherein the first tower is located between the second and third towers and houses one or more of the turbines, wherein one or more first barriers are provided between the first and second towers, and one or more second barriers are provided between the first and third towers, wherein the barriers are configured so that when the one or more first barriers and the one or more second barriers are in a first configuration, a first flow path through the barrage is defined from a first side of the barrage to a second side of the barrage, and when the one or more first barriers and the one or more second barriers are in a second configuration, a second flow path through the barrage is defined from the second side of the barrage to the first side of the barrage, and water flowing through the first and second flow paths flows through the one or more turbines housed in the first tower in (Continued)

the same direction, wherein one or more of the barriers comprises a water impervious flexible membrane, a buoyancy member; and one or more tethers.

16 Claims, 12 Drawing Sheets

(51) Int. Cl.
*E02B 7/50* (2006.01)
*F03B 13/26* (2006.01)

(56) References Cited

U.S. PATENT DOCUMENTS

| 4,859,866 | A |   | 8/1989  | Horne et al. |            |
|-----------|---|---|---------|--------------|------------|
| 2015/0167626 | A1 | * | 6/2015 | Roberts | F03B 3/04 |
|           |   |   |         |              | 415/121.3  |
| 2017/0314222 | A1 | * | 11/2017 | Park | E02B 9/08 |

FOREIGN PATENT DOCUMENTS

| CN | 1776218 |   | 5/2006 |
|----|---------|---|--------|
| DE | 19807640 |   | 9/1998 |
| EP | 0007636 |   | 12/1982 |
| EP | 2864627 |   | 9/2015 |
| GB | 191512355 |   | 10/1916 |
| GB | 2016564 |   | 1/1978 |
| GB | 1594528 | A | 7/1981 |
| GB | 2478539 | A | 9/2011 |
| GB | 2510203 |   | 7/2014 |
| JP | 2003119751 |   | 9/2001 |
| KR | 20120054227 | A * | 11/2010 |
| KR | 20120054227 |   | 5/2012 |
| WO | WO 2012153896 |   | 11/2012 |

OTHER PUBLICATIONS

PCT Search Report for PCT/GB2022/050730, Jun. 15, 2022.
UK IP Office Combined Search and Examination Report, Aug. 31, 2021.
JK IP Office Combined Search and Examination Report, Jan. 7, 2022.

* cited by examiner

TIDAL BARRAGE

The present application is the National-stage filing of and relies on the disclosures of and claims priority to and the benefit of PCT Patent Application PCT/GB2022/050730 filed Mar. 23, 2022 with an original priority date of Mar. 25, 2021 based on UK Patent App. 2104198.3, the disclosures of which are hereby incorporated by reference herein in their entireties.

TECHNICAL FIELD

This disclosure relates to a tidal barrage. In particular, to a tidal barrage that is capable of generating power from both phases of bidirectional flow using a unidirectional turbine generator.

BACKGROUND ART

Conventional tidal barrages (or tidal range barriers) built on the same principles as gravity dams and used for coastal protection are commonplace, for example in the Netherlands. Their further use to generate electricity as a tidal flow passes through their installed turbines, again as in a conventional dam, are less common but do exist. The installation across the estuary at La Rance in France is one well-known example. However, they are considered by some commentators to be uneconomic and environmentally invasive.

The present disclosure relates to a very much lighter, less complex and less costly method of achieving the same objective as the legacy Tidal Range Technology that is also significantly easier and less costly to install and maintain.

It is an object of the invention is to provide a simple, environmentally respectful cost effective and unobtrusive tidal barrage with potential for rapid installation with greatly reduced major offshore civil engineering works and the ability to be readily configured for electrical power generation in full bidirectional or just Ebb Flow operation, flood mitigation or coastal protection as well as offering recreational and transportation benefits.

SUMMARY OF INVENTION

According to the present invention, in a first aspect, there is provided a tidal barrage comprising: a plurality of spaced towers, a plurality of barriers for controlling water flow through the barrage between the towers, and one or more turbine devices, wherein the towers comprise at least first, second and third towers, wherein the first tower is located between the second and third towers and houses one or more of the turbines, wherein one or more first barriers are provided between the first and second towers, and one or more second barriers are provided between the first and third towers, wherein the barriers are configured so that when the one or more first barriers and the one or more second barriers are in a first configuration, a first flow path through the barrage is defined from a first side of the barrage to a second side of the barrage, and when the one or more first barriers and the one or more second barriers are in a second configuration, a second flow path through the barrage is defined from the second side of the barrage to the first side of the barrage, and water flowing through the first and second flow paths flows through the one or more turbines housed in the first tower in the same direction, wherein one or more of the barriers comprises a water impervious flexible membrane, a buoyancy member; and one or more tethers.

The one of more first barriers provided between the first and second towers preferably comprise a single bi-directional barrier comprising a water impervious flexible membrane, a buoyancy member, and one or more tethers.

By the provision of a bi-directional buoyant barrier in the intake channel defined between the first and second towers, passive control may be uniquely provided, wherein the barrier reverses direction in response to the changing flow direction without external control.

The one or more second barriers provided between the first and third towers preferably comprise a pair of uni-directional barriers. The second barriers may each comprise a water impervious flexible membrane, a buoyancy member, and one or more tethers.

Preferably, the towers further comprise a fourth tower, located on the other side of the third tower to the first tower, and one or more third barriers provided between the third and fourth towers, wherein the third tower houses a further one or more of the turbine devices, wherein the barriers are configured so that when the one or more third barriers are in a first configuration, a third flow path through the barrage is defined from a first side of the barrage to a second side of the barrage, and when the one or more third barriers are in a second configuration, a fourth flow path through the barrage is defined from the second side of the barrage to the first side of the barrage, and water flowing through the third and fourth flow paths flows through the one or more turbines housed in the third tower in the same direction.

The one of more third barriers provided between the first and second towers preferably comprise a single bi-directional barrier comprising a water impervious flexible membrane, a buoyancy member, and one or more tethers.

Where a pair of barriers is provided between two of the towers, one of the barriers will be provided either side of the one or more turbines. Where a single barrier is provided it will be movable between a first position on one side of the one or more turbines and a second position on an opposed side of the one or more turbines.

The tidal barrage may have permanent applications across tidal estuaries and also in tidal lagoons either stretching out from a coastline or in a self-contained closed containment located offshore, for purposes including but not limited to electricity generation, flood protection and mitigation, creation of recreational facilities for water-sports or for improved coastal erosion protection.

Where appropriate, bridging structures can be supported on the tidal barrier above the high water mark to give access for purposes including but not limited to maintenance, walking or cycling and to rail and/or vehicular traffic and electricity transmission or cabling such as fibre optics.

The towers, in plan view, may be substantially rectangular or rhomboid in form. The towers may be deployed in a straight or curved array between which a tidal flow is constrained to flow without being able to by-pass the array. The opposing faces of each pair of adjacent towers preferably have substantially parallel flat, smooth surfaces.

As discussed, one or more of the barriers comprises a water impervious flexible membrane, a buoyancy member, and one or more tethers. In use, the membrane may comprise a lower edge portion and an upper edge portion, the lower edge portion may be fixed with respect to a bed of a body of water in which the barrage is sited, the membrane and the buoyancy member may be attached to one another in the upper edge portion, and the tether may comprise a first end portion, which is attached to the buoyancy member and/or to the membrane in the upper edge portion, and a second end portion that is attached to an anchorage.

The buoyancy member may comprise a manifold through which water can be introduced into the interior of the buoyancy member. The manifold may be connected to a pump.

The barriers comprising the buoyancy members, provide buoyancy assisted weirs, which may be deployed in varying configurations, as further disclosed, to suit the function of the tidal barrage for use in Ebb Flow or Bidirectional Flow electricity generation together with any or all of the following further functions including but not limited to flood protection and mitigation, creation of recreational facilities for water-sports, or improved coastal erosion protection.

The towers may be made of any suitable material including but not limited to fabricated steel, stone or cast concrete construction. The towers may be independent to one another with the barrage formed by the provision of a suitable array of the towers and the subsequent provision of suitable barriers between the towers. The towers may comprise prefabricated floodable units, which can be set in place, independently of one another, as distinct elements, before cost effective buoyant weirs are installed therebetween.

By housing turbines in towers that are spaced from one another and providing one or more barriers that comprise buoyant weirs between the towers, it is possible to provide a highly cost effective barrage, which may be installed at a fraction of the cost of any prior art arrangement.

An array of uni-directional turbine devices may be deployed across a lower part of the respective towers. The turbine devices may be arranged substantially at right angles to the direction of the tidal flow.

Each of the turbine devices preferably comprises a convergent section connected to a first end of a mixing chamber such that a venturi is defined between the end of the convergent section and the mixing chamber; a diffuser section connected to a second end of the mixing chamber, the diffuser configured such that in use the pressure at the exit of the diffuser is greater than the pressure at the venturi; at least part of a tube located in the convergent section, such that an annulus is defined between the tube and the convergent section, to form a first flow passage, and the tube defining a second flow passage within the tube; and a turbine connectable to a generator; wherein the turbine is located within the tube.

Further, preferable features are presented in the dependent claims.

BRIEF DESCRIPTION OF THE DRAWINGS

The invention will now be described by way of example with reference to the accompanying drawings.

MODE(S) FOR CARRYING OUT THE INVENTION

The invention will now be described by way of example with reference to the accompanying drawings.

Figure 1:
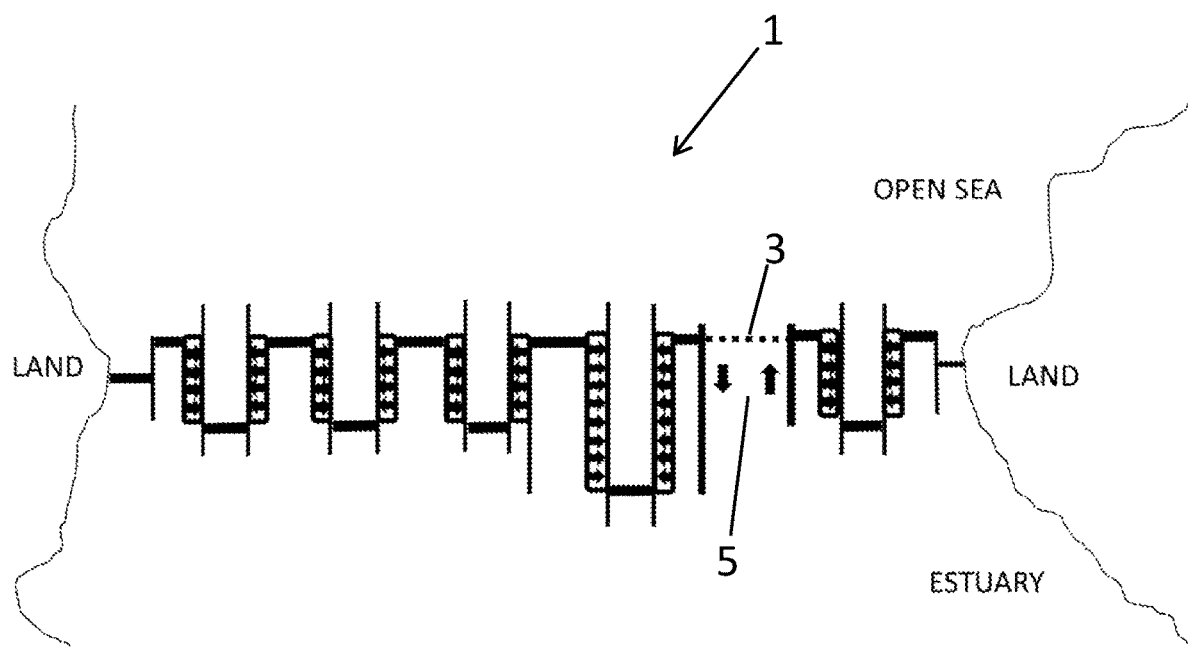
FIG. 1 shows a schematic plan view of a tidal barrage according to a first arrangement in an Ebb flow configuration.
Figure 2:
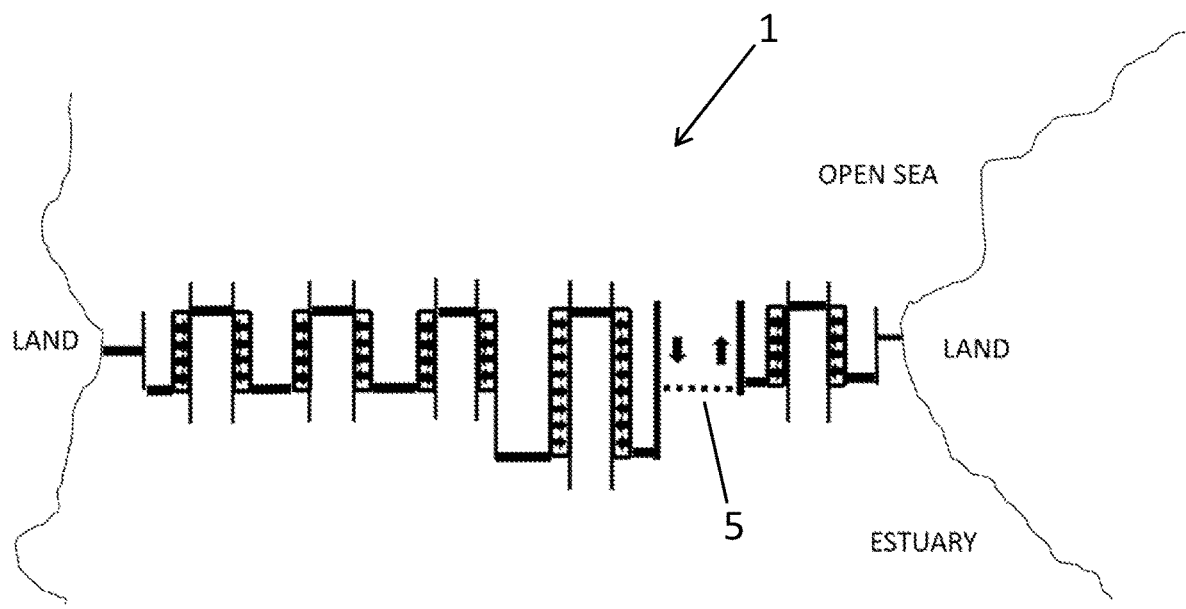
FIG. 2 shows the arrangement of FIG. 1 in a reversed, inward flow, configuration.
Figure 3:
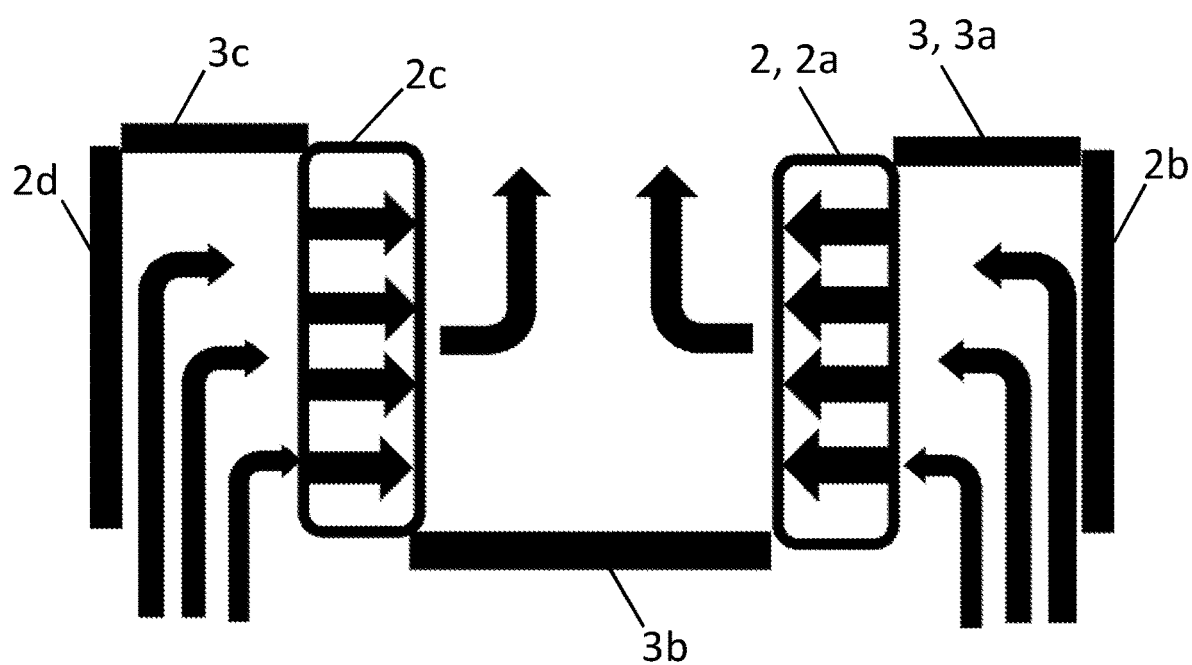
FIG. 3 shows a schematic plan view of one module of the tidal barrage of FIG. 1 in the Ebb flow configuration.
Figure 4:
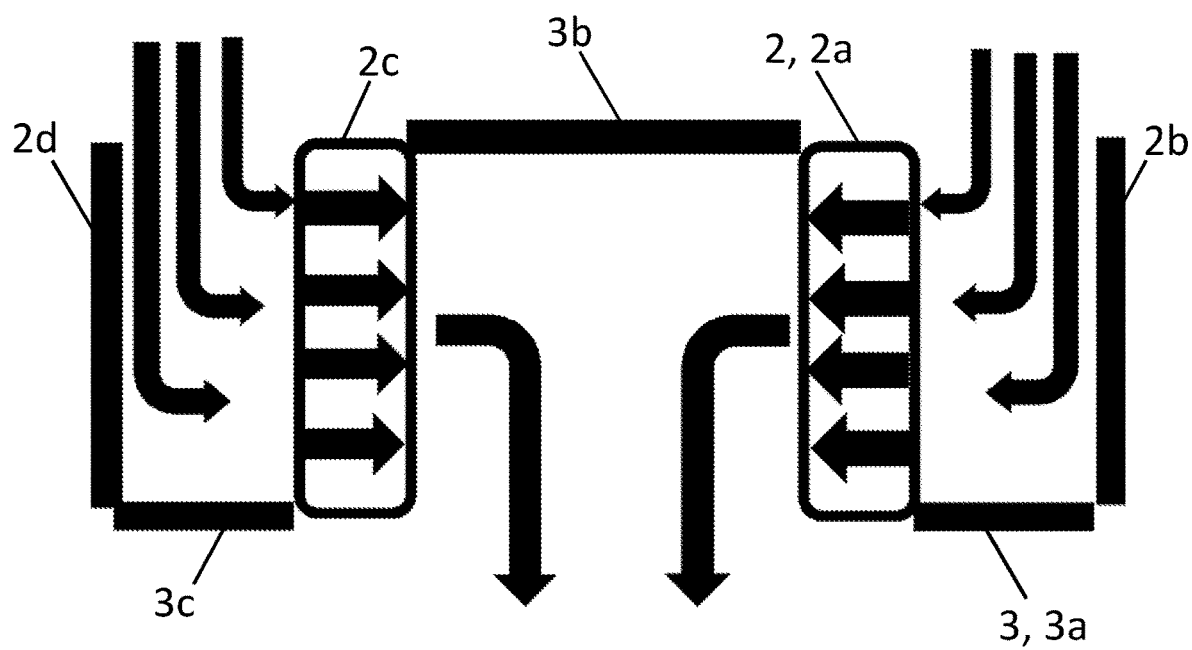
FIG. 4 shows a schematic plan view of the module of FIG. 3 in the reverse flow configuration.

FIGS. 1 and 2 show a schematic plan view of a tidal barrage 1 according to an exemplary arrangement, installed in a body of tidal water, in Ebb and inward flow configurations respectively. FIGS. 3 and 4 show idealised schematic plan views of one preferred power generation module of the barrage of FIGS. 1 and 2, again in Ebb and inward flow configurations.

Figure 6:
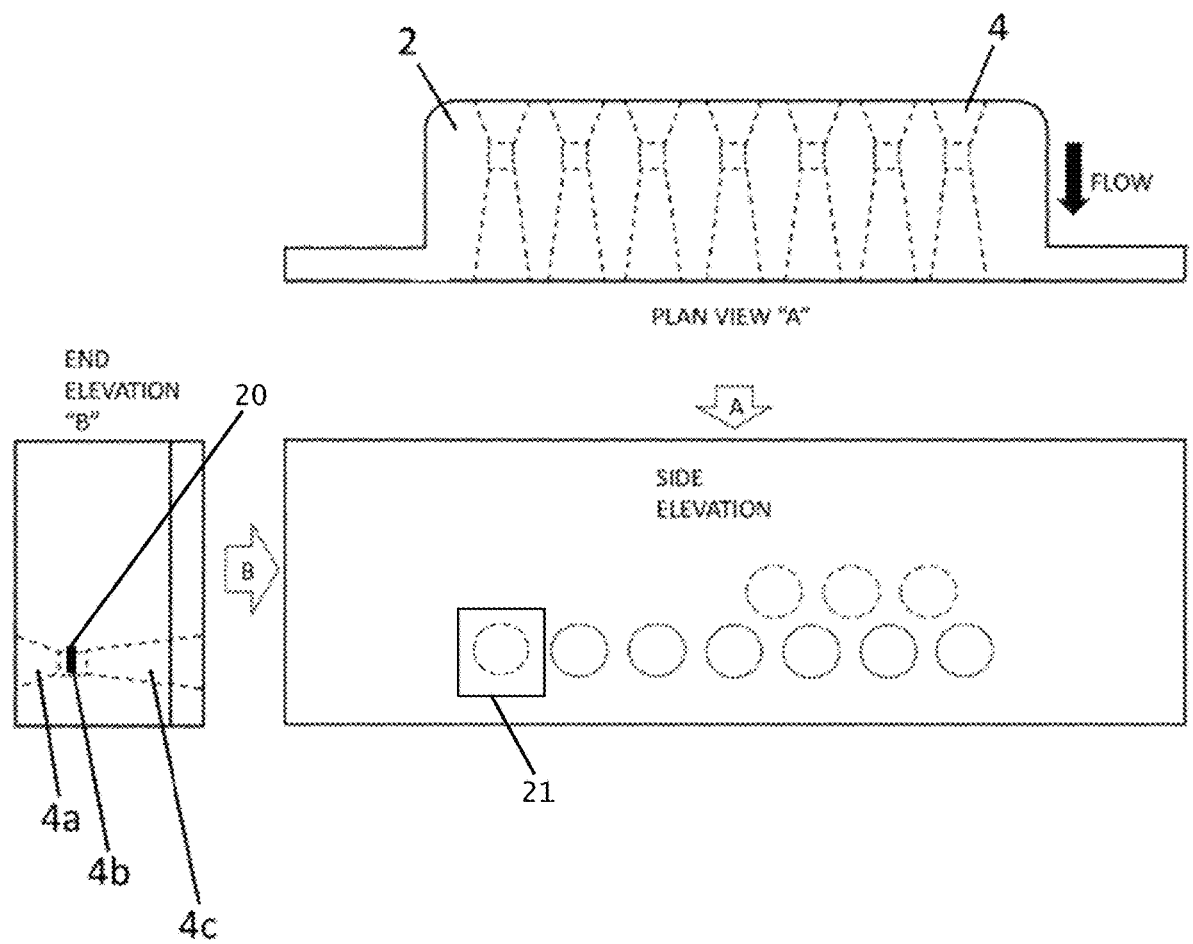
FIG. 6 shows plan and elevation views of a tower suitable for use in the barrage of FIG. 1.

The tidal barrage 1 comprises, in broadest terms, a plurality of spaced towers 2, a plurality of barriers 3 for controlling water flow through the barrage between the towers, and one or more turbine devices 4 (see FIG. 6). The towers comprise at least first, second and third towers 2a, 2b, 2c, wherein the first tower 2a is located between the second tower 2b and third tower 2c and houses one or more of the turbine devices 4. One or more first barriers 3a are provided between the first and second towers 2a, 2b. One or more second barriers 3b are provided between the first and third towers 2a, 2c. The barriers 3 are configured so that when the one or more first barriers 3a and the one or more second barriers 3b are in a first configuration, as shown in FIGS. 1 and 3, a first flow path through the barrage is defined from a first side of the barrage to a second side of the barrage 1 (as indicated by the flow arrows), and when the one or more first barriers 3a and the one or more second barriers 3b are in a second configuration, as shown in FIGS. 2 and 4, a second flow path through the barrage is defined from the second side of the barrage to the first side of the barrage (as again indicated by the flow arrows). As clearly shown, this configuration is such that water flowing through the first and second flow paths flows through the one or more turbines housed in the first tower in the same direction.

In the present arrangement, as is preferred, the towers further comprise a fourth tower 2d, located on the other side of the third tower 2c to the first tower 2a, and one or more third barriers 3c provided between the third and fourth towers 2c, 2d. The third tower 2c houses a further one or more of the turbine devices, wherein the barriers 3 are configured so that when the one or more third barriers 3c are in a first configuration, as shown in FIGS. 1 and 3, a third flow path through the barrage is defined from a first side of the barrage to a second side of the barrage (as again indicated by the flow arrows), and when the one or more third barriers 3c are in a second configuration, as shown in FIGS. 2 and 4, a fourth flow path through the barrage is defined from the second side of the barrage to the first side of the barrage (as again indicated by the flow arrows). Again, as clearly shown, water flowing through the third and fourth flow paths flows through the one or more turbines housed in the third tower in the same direction.

The first and third towers 2a, 2c, the one or more turbine devices 4 housed thereby, and the one or more first, second and third barriers 3a, 3b, 3c therebetween may be considered to define a power generation module, as schematically depicted in FIGS. 3 and 4, wherein the barrage preferably comprises a plurality of the power generation modules. The one or more turbines 4 housed in the first towers 2a preferably face the one or more turbines housed in the third towers 2c of the power generation modules, as shown. The flows through the first and third towers 2a, 2c will thereby meet in the region between the first and third towers and exit the barrage from between the first and third towers 2a, 2c, as clearly seen in FIGS. 3 and 4.

The power generation modules may be provided adjacent to one another, as seen in FIGS. 1 and 2. In such case, in the power generation modules, the second towers 2b house one or more turbines that face away from the one or more turbines housed by the first tower 2a and/or the fourth towers 2d house one or more turbines that face away from the one or more turbines housed by the third towers 2c.

There may be barrage sections provided along with the modules that omit the turbine devices 4 and act simply to block flow around the barrage 1, which may take any suitable construction. Moreover, there may be openings provided that are closed by one or more barriers 3 that allow for the passage of vessels through the barrage. As shown in FIGS. 1 and 2, for example, there may be provided an opening 5 allowing for two shipping lanes to permit passage of shipping through the barrier 3 at high tide. A barrier 3, in place during tidal generation, being opened or removed to leave unimpeded through passage open to shipping.

The tidal barrage of FIGS. 1 and 2, purely by way of non-limiting example comprises five power generation modules plus a shipping channel 5.

The barriers 3 in FIGS. 1 to 4 are shown schematically and may take any suitable known form, including, but not limited to, sluice gates or caissons for example. It is preferable, however, that they comprise buoyant barriers, as discussed in detail below. Regardless of their specific form, one or more or all of the one or more first barriers 3a, the one or more second barriers 3b and the one or more third barriers 3c may comprise a pair of barriers with one of the barriers provided either side of the one or more turbines. This is the case in the arrangement of FIGS. 3 and 4, wherein only the in function barriers are shown. Alternatively, one or more or all of the one or more first barriers 3a, the one or more second barriers 3b and the one or more third barriers 3c may comprise a single barrier that is movable between a first position on one side of the one or more turbines and a second position on an opposed side of the one or more turbines, for suitably controlling flow in the manner depicted in FIGS. 3 and 4.

The towers 2 are not particularly limited in form. It is preferable that they extend along longitudinal axes in plan view, wherein the longitudinal axes are preferably arranged generally parallel to one another and/or are arranged generally in a direction of a tidal flow substantially aligned with the direction of tidal flow. In the present arrangement, as clearly seen, they are both parallel and substantially aligned with the direction of tidal flow. The towers may be substantially rectangular in plan view, as shown. Adjacent towers may comprise opposed parallel substantially planar faces, as again shown.

The flow axes of the one or more turbine devices 4 are preferably arranged at an angle to the tidal flow. They are preferably arranged substantially perpendicular to the longitudinal axes, as is the case in the present arrangement.

Figure 5:
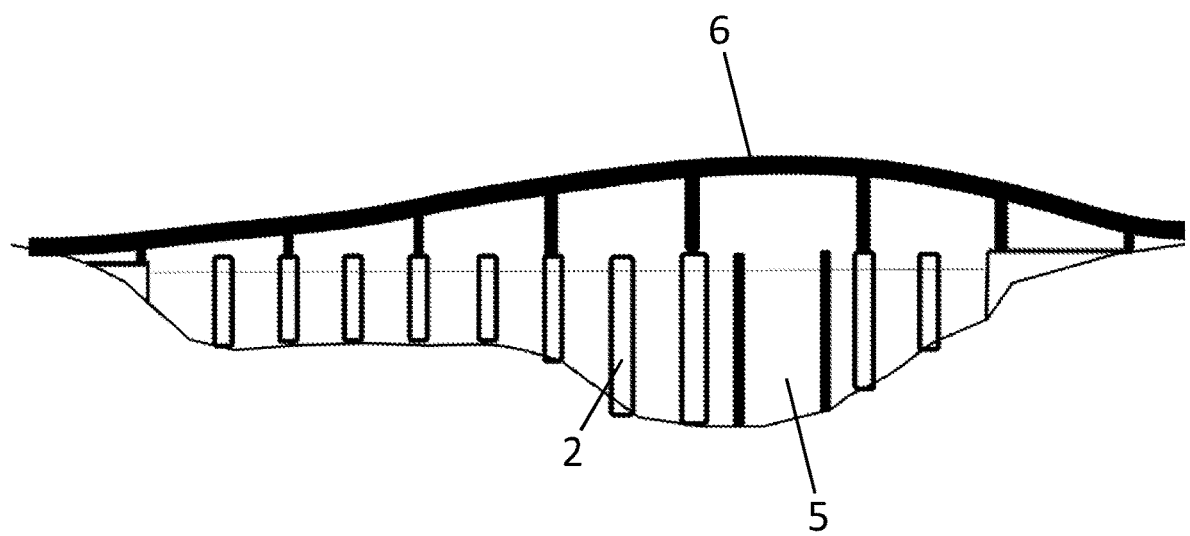
FIG. 5 shows a tidal barrage in elevation carrying a bridge structure.

FIG. 5 shows an elevation view of the tidal barrage of FIGS. 1 and 2 with the additional optional function of the towers 2 as bridge piers. It is exemplarily illustrated how the shipping channels 5 can optionally be located in deeper water. The bridge 6 can serve any of the purposes discussed above. As necessary, an increased elevation of the bridge over the shipping channels can be accommodated as exemplarily shown.

Consideration will now be given, with reference to FIGS. 6 and 7, to the preferred turbine devices and to exemplary structures for the towers provided with the turbine devices.

It is preferable that each of the turbine devices 4 comprises a convergent section 4a, which is connected to a first end of a mixing chamber 4b such that a venturi is defined between the end of the convergent section 4a and the mixing chamber 4b, and a diffuser section 4c, which is connected to a second end of the mixing chamber 4b, the diffuser 4c configured such that in use the pressure at the exit of the diffuser is greater than the pressure at the venturi. It is further preferable that at least part of a tube (not shown) is located in the convergent section 4a, such that an annulus is defined between the tube and the convergent section, to form a first flow passage, and the tube defines a second flow passage within the tube, and a turbine connectable to a generator is located within the tube. As recognized by a skilled artisan, the turbine devices 4 may further include a turbine 20 therein or connected thereto. The turbine devices may be configured in accordance with the teachings of EP 2864627, the contents of which are incorporated herein by reference. It should be noted, however, that the turbine devices 4 may take any suitable alternative forms.

The turbine devices 4 are preferably provided in arrays, which may be configured as desired. The turbine devices 4 may, for example, be provided in a number of rows, as shown. One or more of the turbine devices 4 in any array may comprises a turbine device barrier 22 for selectively blocking flow through the turbine device. Any suitable barrier capable of blocking flow may be implemented for such purpose.

With specific reference to FIG. 6, there is shown, in plan and elevation views, an exemplary tower comprising a bank of turbine devices 4, each of which is configured in accordance with the discussion above. One preferred option is for the converger 4a and diffuser sections 4c to be cast integrally into the tower. In another preferred option, facilities can be provided for vertical wet recovery into an access area above the waterline of a generating section, which comprises the turbine and a generator in a housing plus associated equipment including the mechanical power offtake. In this case a conventional sluice gate or similar conventional device may be installed across the turbine device upstream of the generating section to avoid a high flow by-passing the other turbine devices in the same turbine device bank. Additionally, a second sluice gate may be installed on a downstream side of the generating section if dry access to its housing is required.

In one preferred option, the towers 2 are fabricated off-site in a dry dock or other suitable location and designed to have substantially water-tight floodable internal compartments such that the entire tower is buoyant and can be floated out to location with towing and hold-back tugs in the conventional manner, prior to flooding for lowering it into position.

Figure 7:
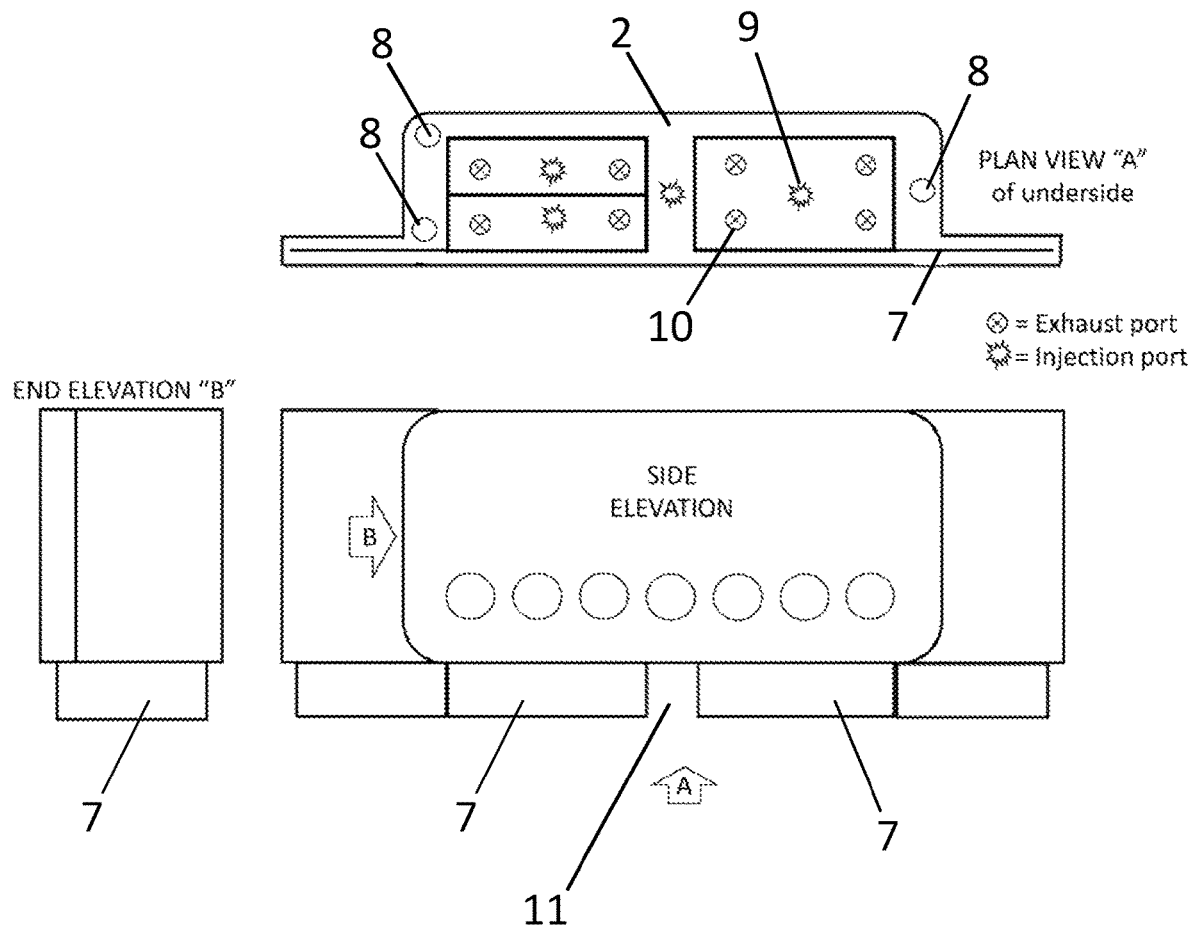
FIG. 7 shows plan and elevation views of an alternative tower suitable for use in the tidal barrage of FIG. 1 comprising optional installation aids.

FIG. 7 discloses optional additional installation aids that may be deployed integral to the towers. These may be omitted. When included, they may be taken in isolation or in combination with one another, as will be readily apparent to those skilled in the art.

For example, one or more scour protection skirts 7 may be attached to the bases of the towers during their fabrication off-site to assist with rapid achievement of positional stability during installation. In some estuary bed conditions, the self-weight of the towers may be deployed to achieve rapid part-penetration of the scour protection skirts 7 by allowing the towers to flood, increasing their self-weight and thereby providing temporary locational stability of the towers into the estuary bed.

Additionally, vertical pile guide tubes 8 may be provided. These may be left open in the tower bases, wherein piles may be driven into the estuary bed through the guide tubes to secure the position of the tower bases. The number of piles to be driven per tower will depend on a number of site-specific conditions including but not limited to the prevailing environmental conditions of water depth, wind and wave incidence, estuary bed morphology and pile size, as will be readily appreciated by those skilled in the art. In a preferred case, at least three piles per tower will be driven as they provide a convenient facility for maintaining the tower bases in a true vertical position during their installation.

Further penetration of the scour protection skirt 7 into the sea bed may be achieved by the conventional techniques of injecting water under the towers inside the periphery of the scour protection skirts 7 through suitable water-injection conduits 9 in their bases and pumping out the resulting slurry through selected members of a set of water exhaust conduits 10. Use of this water exhaust pumping alone with the water-injection conduits 9 closed may also be deployed to lower the pressure in the water under the towers to, in effect, increase their self-weight and achieve further controlled penetration into the estuary bed. Installation may be completed firstly by injecting grout into the annular space between the inside of the vertical pile guide tubes 7 and the outside surface of the piles, and when the grout has set to secure the tower base to the piles then secondly by injecting grout under tower base invert, inside the periphery of the scour protection skirt 7 through the water-injection conduits until all the water from this space is exhausted up through the water exhaust conduits and undiluted grout starts to flow out through the exhaust conduits.

FIG. 7 also discloses a preferred option where the scour protection skirts 7 are each compartmentalised, thereby permitting selective levelling of the tower bases during installation by pumping water into one compartment through selected water-injection conduits 9 whilst pumping water out of another compartment through selected water exhaust conduits 10. FIG. 7 illustrates, merely as an example of many possible configurations, three compartments and three vertical pile guide tubes permitting a vertical trim about both plan axes of the tower base to be maintained during installation, which process may also be assisted by selective wedging of one or more piles into respective vertical pile guide tubes to maintain such points on the tower base fixed vertically whilst the elevation of one or more other points continue to be adjusted.

FIG. 7 also discloses a further optional feature of the configuration of the scour protection skirt which may be adopted where a seepage barrier has already been pre-installed across the estuary bed at the same location. A cross-base gap 11 permits the tower base to be installed straddling the seepage barrier without physical interference. Suitably positioned water-injection conduits 9 may be deployed to flush sand and silt sideways out of the gap and then for the gap to be sealed to the seepage barrier by grout injection through the same water-injection conduits 9.

As discussed above, it is preferable that one or more of the barriers 3 comprises a buoyant barrier. Such buoyant barriers may be arranged in accordance with the disclosure in UK patent application no. 2102604.2, the contents of which are incorporated herein. It is preferable that all of the barriers of FIGS. 3 and 4 are buoyant barriers.

Figure 8:
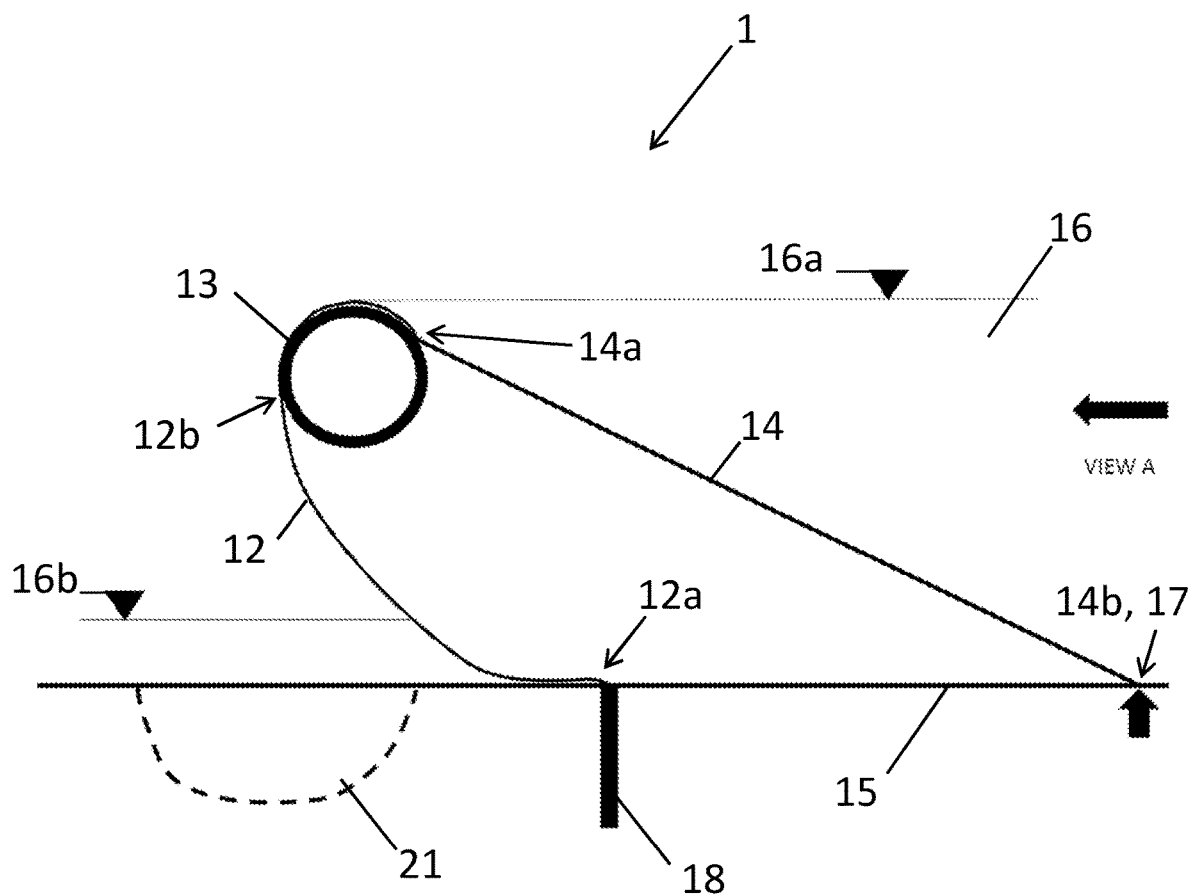
FIG. 8 shows a side view of an exemplary buoyant weir suitable for use as a barrier in the tidal barrage of FIG. 1.

An exemplary buoyant barrier is shown in FIG. 8, which comprises a water impervious flexible membrane 12, a buoyancy member 13, and a tether 14. Preferably, as shown, in use, the membrane 12 comprises a lower edge portion 12*a* and an upper edge portion 12*b*, the lower edge portion 12*a* is fixed with respect to a bed 15 of a body of water 16 in which the barrage 1 is sited, the membrane 12 and the buoyancy member 13 are attached to one another in the upper edge portion 12*b*, and the tether 14 comprises a first end portion 14*b*, which is attached to the buoyancy member 13 and/or to the membrane 12 in the upper edge portion 12*b*, and a second end portion 14*b* that is attached to an anchorage 17. Water levels are indicated at 16*a* and 16*b*. An optional seepage barrier is shown at 18. The seepage barrier 18 may, in some arrangements, optionally serve also as anchorage 17. In alternative arrangements, for example, the lower edge portion 12*a* of the membrane may lie on the bed and be ballasted or otherwise fixed.

The buoyancy member 13 preferably comprises a manifold (not shown) through which water can be introduced into the interior of the buoyancy member 13. The manifold is preferably connected to a pump.

Buoyant barriers offer an extremely cost-effective solution. Moreover, they may be raised and lowered as desired by introducing or evacuating water from the buoyancy member 13. Trenches 21 or otherwise may be provided for receiving the buoyant members in their lowered positions, as required.

By way of non-limiting example only, a tidal barrage according to the arrangement of FIGS. 1 and 2 provided with one or more buoyant barriers in the shipping channel may be configured for surge flooding protection as follows. A barrier 3 in the shipping channel 5 is raised by dewatering the buoyancy element 13. As the water level rises above the normal high tide level, the buoyancy member will continue to rise with it. A specified safe limit for the increasing water level in the upper estuary may be set. In such case it is possible that sluice gates for blocking flow through the turbine devices will be closed to prevent further increase in the upper estuary water level. The buoyancy elements 13 will continue to rise, increasing the head difference across the buoyant barrier and holding back any further flood water, up to an increased elevation which can be specified at the design stage as being sufficient to protect the coastal regions of the upper estuary even from the maximum estimated water levels under storm surge plus Global Warming sea level rise. At some theoretical point in an extreme flooding event even beyond that specified in the design, the changing geometry of the buoyant barrier will eventually inhibit further elevation increase of the buoyancy member and permit water to flow over the buoyancy member as a weir and continue upstream into the upper estuary, as with any other form of barrier that is overwhelmed by unforeseeable sea level rise caused by, for example, a major tsunami.

As discussed further below, with particular reference to FIGS. 9 and 10, bi-directional buoyant barriers may be implemented.

Figure 9:
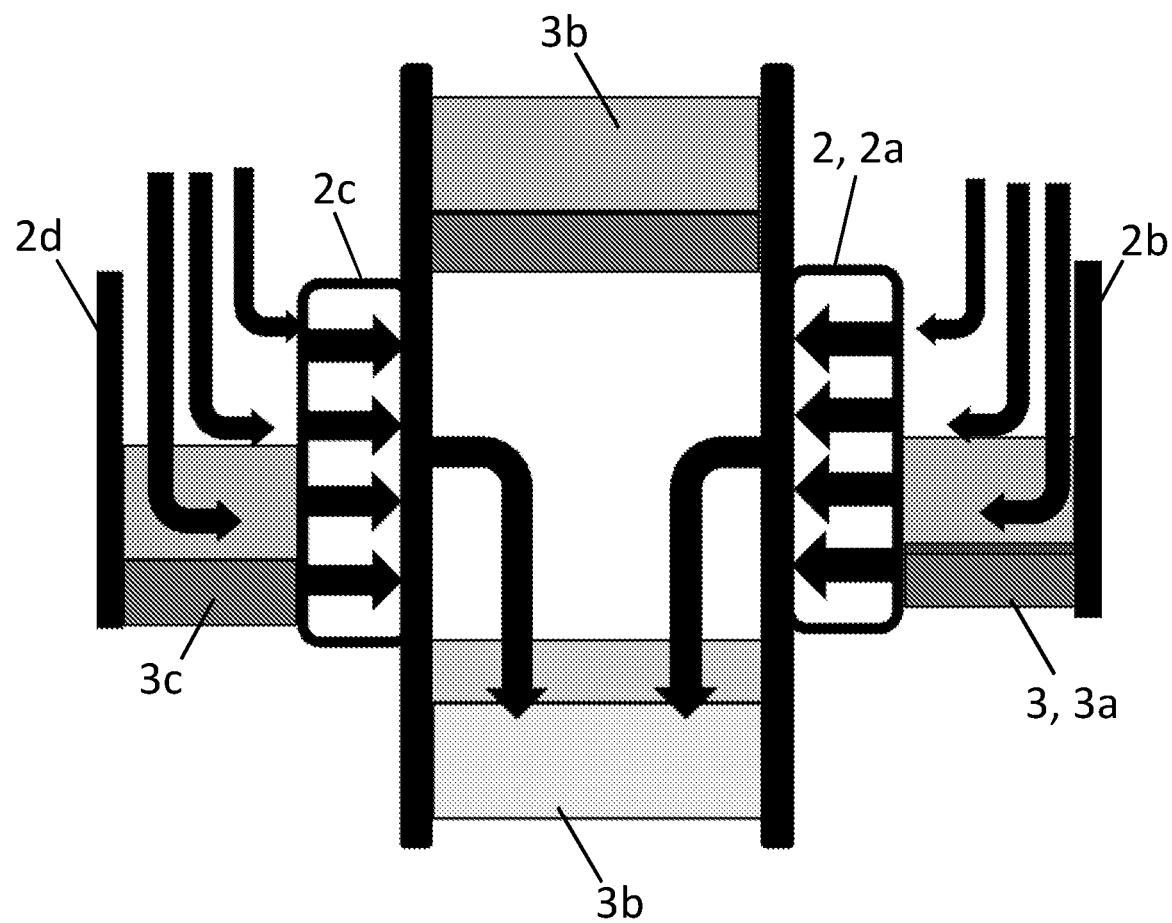
FIG. 9 shows a schematic plan view of a module similar to that shown in FIG. 4 but with a modified barrier arrangement.

FIG. 9 shows an exemplary configuration of one power generation module of the tidal barrage. The arrangement differs to that discussed with reference to FIGS. 3 and 4 in that the barriers 3 comprise uni-directional and bidirectional barriers. In the depicted arrangement, bidirectional barriers 3a, 3c are provided in the intake channels. The bi-directional barriers 3a, 3c are passive and reverse direction in response to the changing flow direction without external control. The two unidirectional barriers 3b in the central outflow channel may be operated in any circumstances by partially flooding the out-of-function buoyancy element 13 to make it sink during the period of generation and then dewatered again to bring it back into function whilst the tide is turning. It might also operate passively if the out-of-function barrier sinks to the sea bed automatically under the pressure from the flowing tide passing over it. The extent to which this passive operation is successful depends on specific project circumstances.

It must be noted that alternative combinations of unidirectional and bidirectional buoyant barriers are possible, as well as different combinations of buoyant and non-buoyant barriers. Numerous suitable arrangements will be readily appreciated by those skilled in the art. The present invention is not to be limited in this regard.

In any of the described arrangements, the inflow channels may be wider than the central outflow channels or vice versa.

In consideration of the barriers, these may all be of a conventional form, may all be buoyant, or a hybrid configuration may be adopted. For example, the inflow channels may be fitted with passive bi-directional buoyant weirs and the outflow channel may be fitted with conventional barriers of any desired form. Numerous and varied configurations will be readily envisaged by those skilled in the art.

Figure 10:
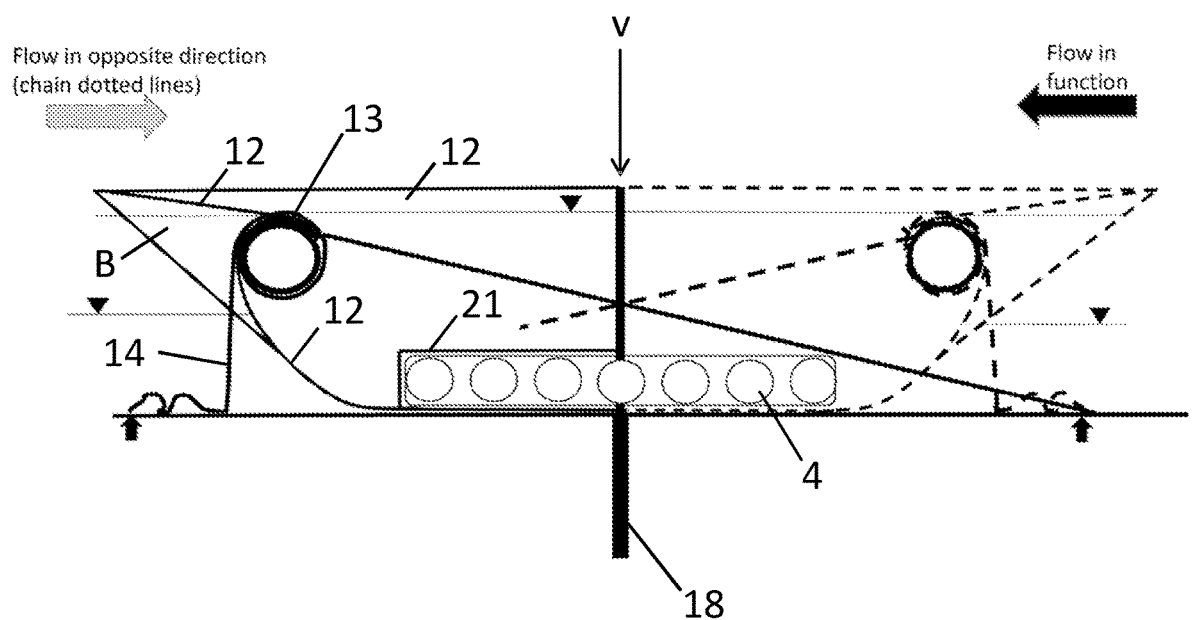
FIG. 10 shows a side elevation of a bi-directional weir suitable for use as a barrier in the tidal barrage of FIG. 1.

FIG. 10 shows a side elevation of a bidirectional buoyant barrier, of a form as disclosed in UK patent application no. 2102604.2. FIG. 10 shows the complete translation of the buoyant barrier as the tide reverses. The view represents an end elevation, rather than cross-section, wherein the buoyant weir/barrier in the depicted arrangement stretches between two of the towers 2. As indicated by the right hand arrow, the active flow in FIG. 10 is from right to left, wherein the detail in solid lines shows the active position of the weir components. The detail shown in broken lines is representative of the position of those components in the event there is a flow reversal.

The membrane 12 is attached on a vertical centre line v up the tower wall above the anchor. The edge of the membrane 12 is folded against the wall to permit free movement of the buoyancy member 13 as the water level and flow direction changes. Note in this way that the membrane 12 forms a bight B stretching out a short distance downstream of the buoyancy 13 at each of the buoyancy member ends such that the top level of the membrane 12 in the bight B at no point will fall below the top of the buoyancy member 13 and will be folded away from rather than dragged across the surface of the end wall 2 to minimise abrasion damage to membrane 12. Note also that the membrane 12 is held against the end wall by water pressure and rises to above the high water mark to minimise seepage losses. A slot 21 is provided in the flexible membrane 12 to provide access for the flow into the turbine devices 4.

Figure 11:
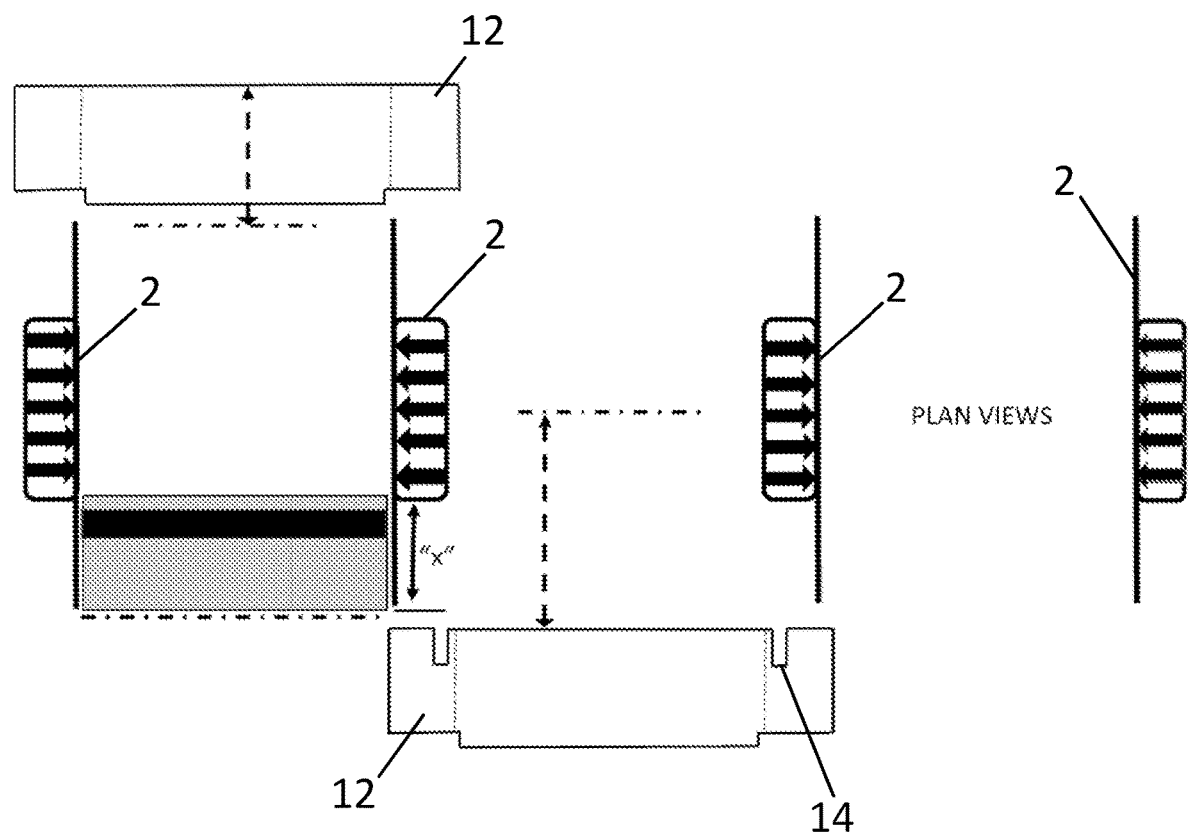
FIG. 11 shows the developed shape of the membranes of exemplary unidirectional and bidirectional buoyant weirs on a straight alignment.

FIG. 11 shows the developed shape of an exemplary flexible membrane 12 intended for bi-directional operation between the convergers of the turbine devices in two adjacent parallel towers 2. The position of the slots 14 is shown in the sections of the membrane that are folded up vertically against the parallel faces of the adjacent towers. Also shown is the developed shape of the membrane of one of the four unidirectional barriers immediately adjacent, where no slots 14 are required.

A single power generation module, as is clear from the discussion herein, comprises a single central upstream section flanked by two downstream sections which are shared with the adjacent modules.

The central upstream section preferably contains a single bidirectional buoyant weir, the membrane of which is centrally anchored to the estuary bed. This single bidirectional buoyant weir self-adjusts with every tidal flow reversal. Undue seepage under the membrane potentially causing head loss and/or downstream ground heave is prevented or sufficiently mitigated by either or both of the central seepage barrier 18 and/or a sufficiently long seepage path under the membrane.

Each of the two flanking downstream sections preferably contains two unidirectional buoyant weirs, the upstream of which is in function at all times, depending on the tidal direction, to maintain the head difference between the upstream and downstream sides of the tidal barrage. The downstream buoyant weir is out-of-function and is at all times actively submerged by partial flooding or passively submerged by overtopping of the downstream flow. Undue seepage flow and any consequent downstream ground heave is preferably prevented from by-passing each of the four unidirectional buoyant barriers in each power generation module by fitting scour skirts to the underside of the towers during their construction as described above and then by preferentially ensuring dimension "x" on FIG. 11 (being the length of the membrane remaining in contact with the estuary bed) provides a sufficiently long seepage path to mitigate seepage to an acceptable low amount, or, if necessary, installing a seepage barrier at each end of the towers acting also as the anchorage for the membrane.

Note also that as a matter of detailed design there may be certain tidal barrage installations where environmental conditions and other design factors may lead to choice of a level of rock dumping over the whole or part of the plan footprint of the tidal barrage. This might be chosen to mitigate local scour at the barrage inlets and outlets for example and will in any event assist with mitigating any susceptibility to downstream estuary bed ground heave in that area.

Figure 12:
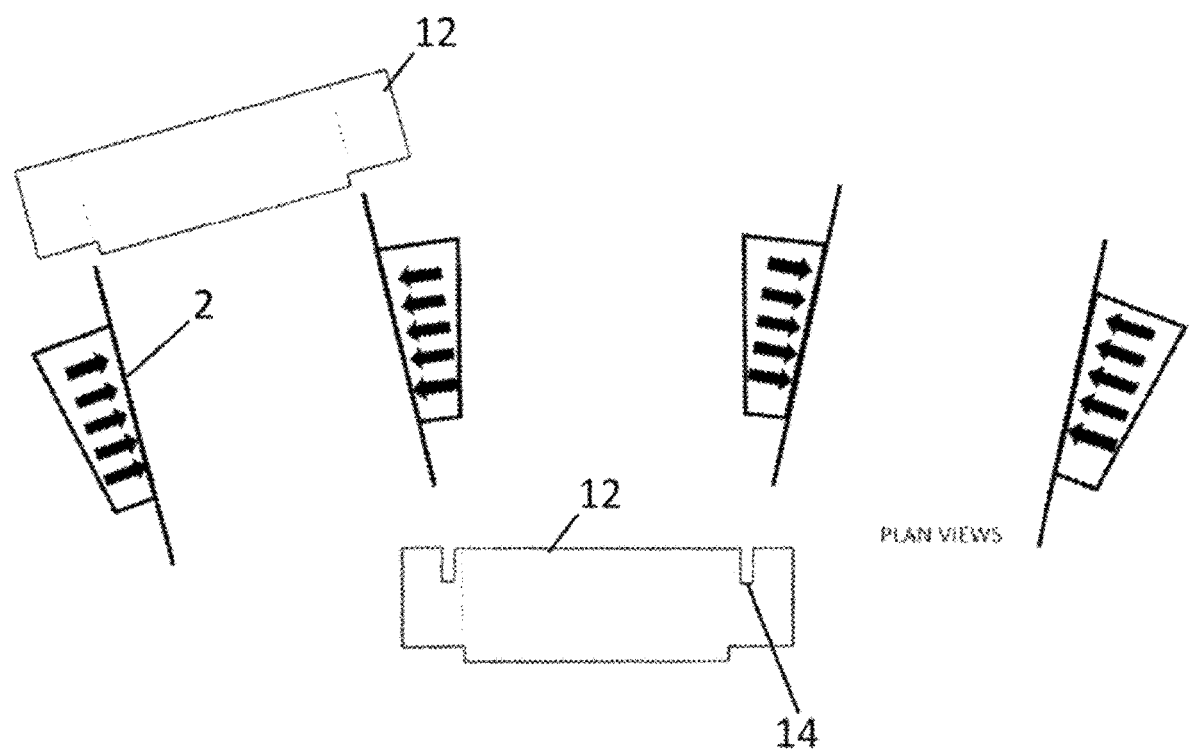
FIG. 12 shows trapezoidal towers on a curved alignment with the same shaped membranes as in FIG. 11.

FIG. 12 discloses the same developed shapes of typical flexible membranes 12 intended for unidirectional operation between the diffusers of the two adjacent parallel towers 2 on a curved alignment. FIG. 12 also discloses a preferable trapezoidal plan shape of the towers for achieving a curved arrangement of the tidal barrage whilst maintaining opposed parallel faces of adjacent towers 2.

Note that the overall configuration of a tidal barrage 1 as shown for example in FIGS. 1 and 2 and configured in accordance with any of the principles discussed above permits the following desirable design outcomes to be achieved:

The natural tidal flow velocity and volumetric flowrate profiles at each point on the alignment across the estuary can effectively be preserved, minimising any environmental disturbance to the overall seabed morphology. This is possible because the number and size of the turbine devices in each tower can be varied to match the natural flow velocity and volume passing through the position of each module on the barrage. For example, in FIG. 1 the forth module from the left is assumed to sit in a deeper channel which carries a larger volume of water than needs to be passed by the other modules to maintain optimal performance in all modules whilst preserving the original flow profiles across the alignment. As a result it is designed to be longer than the other modules to carry more and/or larger turbine devices.

UK patent application no. 2102604.2 discloses that as a first order approximation, the displacement (being a function of the diameter) of the buoyancy element in a buoyant weir/barrier is predominantly equal to the weight of water behind that part of the membrane that is carried with an air gap below it vertically above the downstream water-line. The smaller dead weight of the buoyancy element itself together with that of the membrane is a secondary downwards force to be reacted by the buoyancy. This is, inherently, in any event, a very light and low-cost alternative to any solid structural Tidal Range Barrier alternatives such as rockfill bunds or structural dam barriers designed to resist the maximum overturning moment that might be applied to them from the head difference between the water upstream and downstream of the barrier. The longer the alignment, the greater the capital cost difference in favour of a barrage comprising buoyant barriers, as described herein. Moreover, as the water depth increases, the size of the buoyancy in a buoyant weir needed to achieve the same head difference will increase only marginally to match the very slight additional wet weight of the longer flexible membrane needed. The cost of the buoyant weir to achieve any given head difference is to a first order approximation therefore independent of water depth. By complete contrast, the cross-sectional area of any structural barrier, a gravity dam for example, will increase in proportion with a factor approximating to the square of the water depth giving the buoyant weir an increasing capital cost advantage as the water depth increases.

Turbine devices of the form disclosed herein provide a friendly technology for any fish passing through in the approximately 80% of the flow that by-passes the turbine. The 20% or so of the flow passing through the turbine may be screened with a much smaller and lower cost screen than that needed by any alternative technology. This screen can be readily cleaned by mechanical devices such as brushes or water jets or more simply, by a short burst of powered reverse thrust of the turbines at slack tide. Any debris thus removed can continue through the turbine devices in the 80% of through flow.

Although the tidal barrage has been described with reference to an installation across a tidal estuary, it can also be installed in other bodies of water for example for unidirectional flow across a large river or in Ebb flow only generation across a tidal flow. Also, where a significant tidal flow occurs in quite shallow water, perhaps even exposing the estuary bed at low tide, the shallow water depth can limit the maximum diameter of any renewable energy generating device necessitating a large number of such devices, possibly requiring a longer alignment than can be accommodated acceptably in the width of the estuary. Excavating a trench along the alignment to accept larger diameter devices may be unsatisfactory as such a trench is susceptible to silting up and may lead to concentrating all the larger generators in the deeper water section, thus radically changing the natural distribution of velocity profiles across the alignment with damaging environmental consequences. In cases of this sort, the disclosed arrangements permit a large number of generating devices to be deployed to match the natural flow patterns independently of the available length of the tidal barrier alignment.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents. Numerous alternative arrangements will be readily appreciated by those skilled in the art within the scope of the claims.

The invention claimed is:

1. A tidal barrage comprising:
a plurality of spaced towers,
a plurality of barriers for controlling water flow through the barrage between the towers, and
one or more turbine devices,
wherein the towers comprise at least first, second, third, and fourth towers,
wherein the first tower is located between the second and third towers, the fourth tower is located on the other side of the third tower from the first tower, and the first and third towers house one or more of the turbine devices,
wherein a first barrier, which is bi-directional, is provided between the first and second towers, and a pair of second barriers, which are uni-directional, are provided between the first and third towers, and a third barrier, which is bi-directional, is provided between the third and fourth towers,
wherein the barriers are configured so that:
when the first barrier and the pair of second barriers are in a first configuration, a first flow path through the barrage is defined from a first side of the barrage to a second side of the barrage, and when the first barrier and the pair of second barriers are in a second configuration, a second flow path through the barrage is defined from the second side of the barrage to the first side of the barrage, and water flowing through the first and second flow paths flows through the one or more turbines housed in the first tower in the same direction,
when the third barrier is in a first configuration, a third flow path through the barrage is defined from a first side of the barrage to a second side of the barrage, and when the third barrier is in a second configuration, a fourth flow path through the barrage is defined from the second side of the barrage to the first side of the barrage, and water flowing through the third and fourth flow paths flow through the one or more turbines housed in the third tower in the same direction, and
wherein at least the first and third barriers comprises a water impervious flexible membrane, a buoyancy member, and one or more tethers.

2. The tidal barrage as claimed in claim 1, wherein the second barriers each comprise a water impervious flexible membrane, a buoyancy member, and one or more tethers.

3. The tidal barrage as claimed in claim 1, wherein the one or more turbines housed in the first tower face the one or more turbines housed in the third tower.

4. The tidal barrage as claimed in claim 3, wherein the second tower houses one or more turbines that face away from the one or more turbines housed by the first tower and/or the fourth tower houses one or more turbines that face away from the one or more turbines housed by the third tower.

5. The tidal barrage as claimed in claim 1, wherein the first and third towers, the one or more turbine devices housed thereby, and the one or more first, second and third barriers define a power generation module, wherein the barrage comprises a plurality of the power generation modules provided adjacent to one another.

6. The tidal barrage as claimed in claim 1, wherein the towers, in plan view, extend along longitudinal axes.

7. The tidal barrage as claimed in claim 6, wherein the longitudinal axes are arranged generally parallel to one another and/or are arranged generally in a direction of a tidal flow.

8. The tidal barrage as claimed in claim 6, wherein flow axes of the one or more turbine devices are substantially perpendicular to the longitudinal axes.

9. The tidal barrage as claimed in claim 1, wherein the towers are substantially rectangular in plan view.

10. The tidal barrage as claimed in claim 1, wherein adjacent towers comprise opposed parallel substantially planar faces.

11. The tidal barrage as claimed in claim 1, wherein, in use, the membrane comprises a lower edge portion and an upper edge portion, the lower edge portion is fixed with respect to a bed of a body of water in which the barrage is sited, the membrane and the buoyancy member are attached to one another in the upper edge portion, and each of the one or more tethers comprises a first end portion, which is attached to the buoyancy member and/or to the membrane in the upper edge portion, and a second end portion that is attached to an anchorage.

12. The tidal barrage as claimed in claim 1, wherein the buoyancy member comprises a manifold through which water can be introduced into and/or removed from the interior of the buoyancy member.

13. The tidal barrage as claimed in claim 12, wherein the manifold is connected to a pump.

14. The tidal barrage as claimed in claim 1, wherein each of the one or more turbine devices comprises:
   a convergent section connected to a first end of a mixing chamber such that a venturi is defined between the end of the convergent section and the mixing chamber;
   a diffuser section connected to a second end of the mixing chamber, the diffuser configured such that in use the pressure at the exit of the diffuser is greater than the pressure at the venturi;
   at least part of a tube located in the convergent section, such that an annulus is defined between the tube and the convergent section, to form a first flow passage, and the tube defining a second flow passage within the tube; and
   a turbine connectable to a generator; wherein the turbine is located within the tube.

15. The tidal barrage as claimed in claim 1, wherein each of the towers houses an array of the turbine devices.

16. The tidal barrage as claimed in claim 15, wherein one or more of the turbine devices comprises a turbine device barrier for selectively blocking flow through the turbine device.

* * * * *